(12) United States Patent
Henry et al.

(10) Patent No.: US 7,151,864 B2
(45) Date of Patent: Dec. 19, 2006

(54) INFORMATION RESEARCH INITIATED FROM A SCANNED IMAGE MEDIA

(75) Inventors: Steven G. Henry, Ft. Collins, CO (US); Kristin M. Smith, Meridian, ID (US); John P. Wolf, Eagle, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 742 days.

(21) Appl. No.: 10/247,113

(22) Filed: Sep. 18, 2002

(65) Prior Publication Data

US 2004/0052433 A1    Mar. 18, 2004

(51) Int. Cl.
G06K 9/54 (2006.01)
G06K 7/00 (2006.01)
G06F 7/00 (2006.01)

(52) U.S. Cl. .......................... 382/305; 382/312; 707/3

(58) Field of Classification Search ................ 382/305, 382/312, 306, 229, 231; 704/1, 2, 9, 257; 707/2, 3, 5, 6, 10; 358/505
See application file for complete search history.

(56) References Cited

U.S. PATENT DOCUMENTS

| | | | | |
|---|---|---|---|---|
| 5,680,511 A | * | 10/1997 | Baker et al. ................ 704/257 |
| 5,819,260 A | * | 10/1998 | Lu et al. ........................ 707/3 |
| 5,825,943 A | * | 10/1998 | DeVito et al. .............. 382/306 |
| 5,867,597 A | | 2/1999 | Peairs et al. |
| 5,960,383 A | * | 9/1999 | Fleischer ........................ 704/9 |
| 5,983,216 A | * | 11/1999 | Kirsch et al. .................. 707/2 |
| 6,178,396 B1 | * | 1/2001 | Ushioda ........................ 704/1 |
| 6,182,029 B1 | * | 1/2001 | Friedman ...................... 704/9 |
| 6,278,992 B1 | | 8/2001 | Curtis et al. .................... 707/3 |
| 6,278,996 B1 | * | 8/2001 | Richardson et al. ........... 707/6 |
| 6,470,307 B1 | * | 10/2002 | Turney .......................... 704/9 |
| 6,571,240 B1 | * | 5/2003 | Ho et al. ........................ 707/5 |
| 6,704,699 B1 | * | 3/2004 | Nir ................................ 704/2 |
| 6,748,387 B1 | * | 6/2004 | Garber et al. ................ 707/10 |

FOREIGN PATENT DOCUMENTS

| | | |
|---|---|---|
| EP | 0544434 | 6/1993 |
| EP | 0677812 | 10/1995 |
| EP | 0752673 | 1/1997 |

OTHER PUBLICATIONS

Jun. 24, 2004 Search Report for Application No. PCT03/29810.

* cited by examiner

Primary Examiner—Kanjibhai Patel (57) ABSTRACT

A device scans text of an image media and generates text data corresponding to the scanned text. A research component of the device generates a phrase list from the text data and initiates research for information corresponding to the phrase list.

67 Claims, 6 Drawing Sheets

INFORMATION RESEARCH INITIATED FROM A SCANNED IMAGE MEDIA

TECHNICAL FIELD

This invention relates to information research initiated from a scanned image media.

BACKGROUND

Researching on the Internet, or even determining where to begin a search for desired information, can be complicated and daunting for unsophisticated computer users having a need to find information related to a particular printed document. Computers provide a convenient means to search for information, documents, and any other electronic forms of data. However, to find information related to a printed document, a user still has to determine applicable research terms from the document and input the research terms into a computer to initiate a search process, which is typically accomplished with a search engine.

Scanning technology captures an image, or regions of an image, from a printed document, photograph, or other similar image media, and converts the image regions into an electronic form. Advances in media reproduction and imaging technology have created smaller and affordable multifunction devices in place of traditional stand-alone, single purpose devices such as photocopiers, fax machines, and flatbed scanners. Multifunction devices, as the name implies, are devices capable of multiple functions such as printing, copying, scanning, faxing and/or emailing. An example of a multifunction device commonly referred to as a digital sender scans an image media and can email the scanned image to a recipient, without the need of a desktop computing device.

SUMMARY

In an implementation, a device scans text of an image media and generates text data corresponding to the scanned text. A research component generates a phrase list from the text data and initiates research for information corresponding to the phrase list.

BRIEF DESCRIPTION OF THE DRAWINGS

The same numbers are used throughout the drawings to reference like features and components.

DETAILED DESCRIPTION

Information research initiated from a scanned image media is described in one implementation as a multifunction device that includes a scan unit to scan text of an image media, and includes a scan component, such as optical character recognition software, to generate text data corresponding to the text. A research component of the multifunction device generates a phrase list from the text data and initiates research for information corresponding to the phrase list. As used herein, a phrase is any word or group of words.

An individual wanting to research and locate information related to a document can scan the document with a scanning or multifunction device and receive research results that correspond to the document text. The research results can include Web (e.g., World Wide Web) pages, a list of Web links, and/or any number of other types of electronic documents from any number of sources.

Further, the scan component in a scanning device can be implemented to recognize a phrase identifier and generate selected text data corresponding to text designated with the phrase identifier. A phrase identifier can be a mark written on an image media to identify a phrase (e.g., a word or group of words), or the phrase identifier can be an electronic mark implemented to identify a phrase. The research component can also receive input phrases and generate a selected phrase list from the selected text data and from the input phrases. The research component can then generate the phrase list from the text data and from the selected text data.

General reference is made herein to one or more multifunction and computing devices. Although specific examples may refer to devices having particular component implementations, such examples are not meant to limit the scope of the claims or the description, but are meant to provide a specific understanding of the information research techniques described herein. Furthermore, the devices are merely exemplary and are not intended to limit application of the claimed subject matter to devices that include only the components described herein. Accordingly, other multifunction and/or computing devices having components different from and/or in addition to those described herein can be used to implement information research initiated from a scanned image media.

Exemplary Multifunction Device

Figure 1:
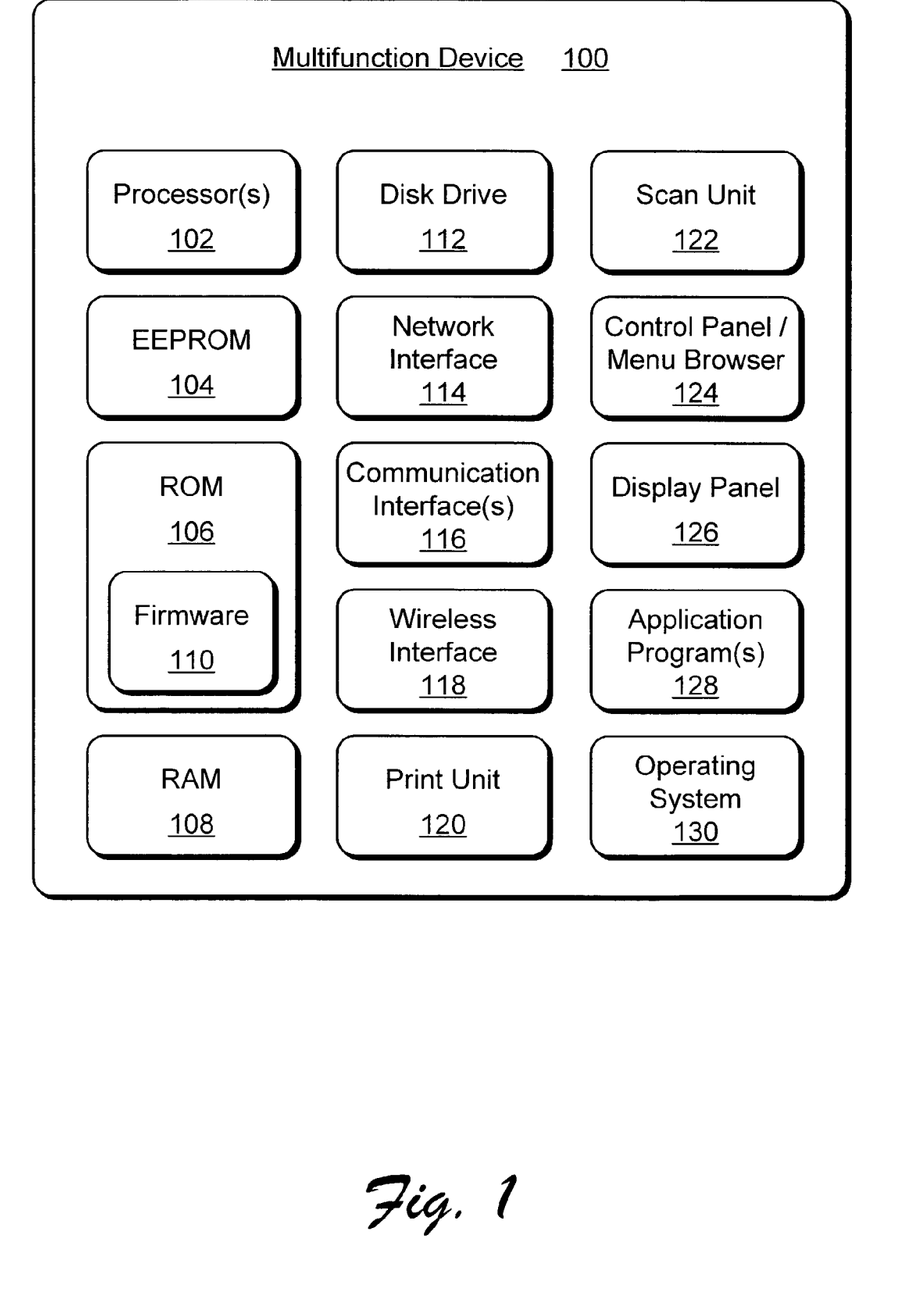
FIG. 1 illustrates various components of an exemplary multifunction device.

FIG. 1 illustrates various components of an exemplary multifunction device 100 that can be utilized to implement information research initiated from a scanned image media. A multifunction device, as the name implies, is a device for multiple functions which are related to, but not limited to, printing, copying, scanning, to include image acquisition and text recognition, sending and receiving faxes, print media handling, and/or data communication, either by print media or electronic media, such as email or electronic fax.

Multifunction device 100 includes one or more processors 102 (e.g., microprocessors, controllers, etc.) which process various instructions to control the operation of multifunction device 100 and to communicate with other electronic and computing devices. Multifunction device 100 can be implemented with one or more memory components, examples of which include an electrically erasable programmable read-only memory (EEPROM) 104, ROM 106 (non-erasable), and a random access memory (RAM) 108, all of which provide data storage mechanisms for multifunction device 100.

The memory components (EEPROM 104, ROM 106, and RAM 108), store various information and/or data such as configuration information, fonts, templates, print data, scanned image data, and menu structure information. Although not shown, a particular multifunction device can also include a flash memory device in place of, or in addition to, EEPROM 104 and ROM 106. Additionally, although not shown, a system bus typically connects the various components within multifunction device 100.

Multifunction device 100 also includes a firmware component 110 that is implemented as a permanent memory module stored on ROM 106, or implemented with other components in multifunction device 100. For example, firmware can be implemented as a component of processor(s) 102, or as a component of a device controller. Firmware 110 can be implemented to coordinate operations of the hardware within multifunction device 100 and contains programming constructs used to perform such operations. Multifunction device 100 also includes a disk drive 112 that provides additional storage for data being printed, copied, scanned, and/or faxed, or other information maintained by multifunction device 100.

Multifunction device 100 includes a network interface 114 and one or more communication interfaces 116, such as a serial and/or parallel interface, a USB interface, and other similar communication interfaces. Network interface 114 provides a connection between multifunction device 100 and a data communication network. Network interface 114 allows devices coupled to a common data communication network to send print jobs, faxes, menu data, and other information to multifunction device 100 via the network. Similarly, a communication interface 116 provides a data communication path directly between multifunction device 100 and another electronic or computing device. Multifunction device 100 can also include a wireless communication interface 118 that provides infrared (IR), 802.11, Bluetooth, or similar RF communication with another electronic or computing device.

Multifunction device 100 also has a print unit 120 that includes mechanisms arranged to selectively apply an imaging medium such as liquid ink or toner to a print media in accordance with print data corresponding to a print job. Print media can include any form of media used for printing such as paper, plastic, fabric, Mylar, transparencies, and the like, and different sizes and types such as 8½×11, A4, roll feed media, etc. For example, print unit 120 can include a conventional laser printing mechanism that selectively causes toner to be applied to a print media. The toner on the print media can then be more permanently fixed to the print media by selectively applying thermal energy to the toner, for example. It should be recognized that there are many different types of print units available, and that for the purposes of the present invention, print unit 120 can be implemented with any one of the different types of print units.

Multifunction device 100 also includes a scan unit 122 that can be implemented as an optical scanner to produce machine-readable image data signals that are representative of a scanned image, such as a photograph, a page of printed text, or any combination of text and images. The image data signals produced by scan unit 122 can be used to reproduce the scanned image on a display device or with a printing device.

Multifunction device 100 also includes a control panel and menu browser 124, and a display panel 126. The control panel and menu browser 124 allows a user of multifunction device 100 to navigate the device's menu structure. Control panel 124 can include indicators and/or a series of buttons, switches, or other selectable controls that are manipulated by a user of the multifunction device. Display panel 126 is a graphical display that provides information regarding the status of multifunction device 100 and the current options available to a user through the menu structure.

Multifunction device 100 includes one or more application program(s) 128 and an operating system 130 which can be stored in non-volatile memory (e.g., ROM 106) and executed on a processor 102 to provide a runtime environment in which software applications can run or execute. A runtime environment facilitates the extensibility of multifunction device 100 by allowing various interfaces to be defined that, in turn, allow an application program 128 to interact with multifunction device 100. For example, an application program 128 can include an embedded Web server to provide simplified network access from multifunction device 100, and to multifunction device 100.

Exemplary Computing Device

Figure 2:
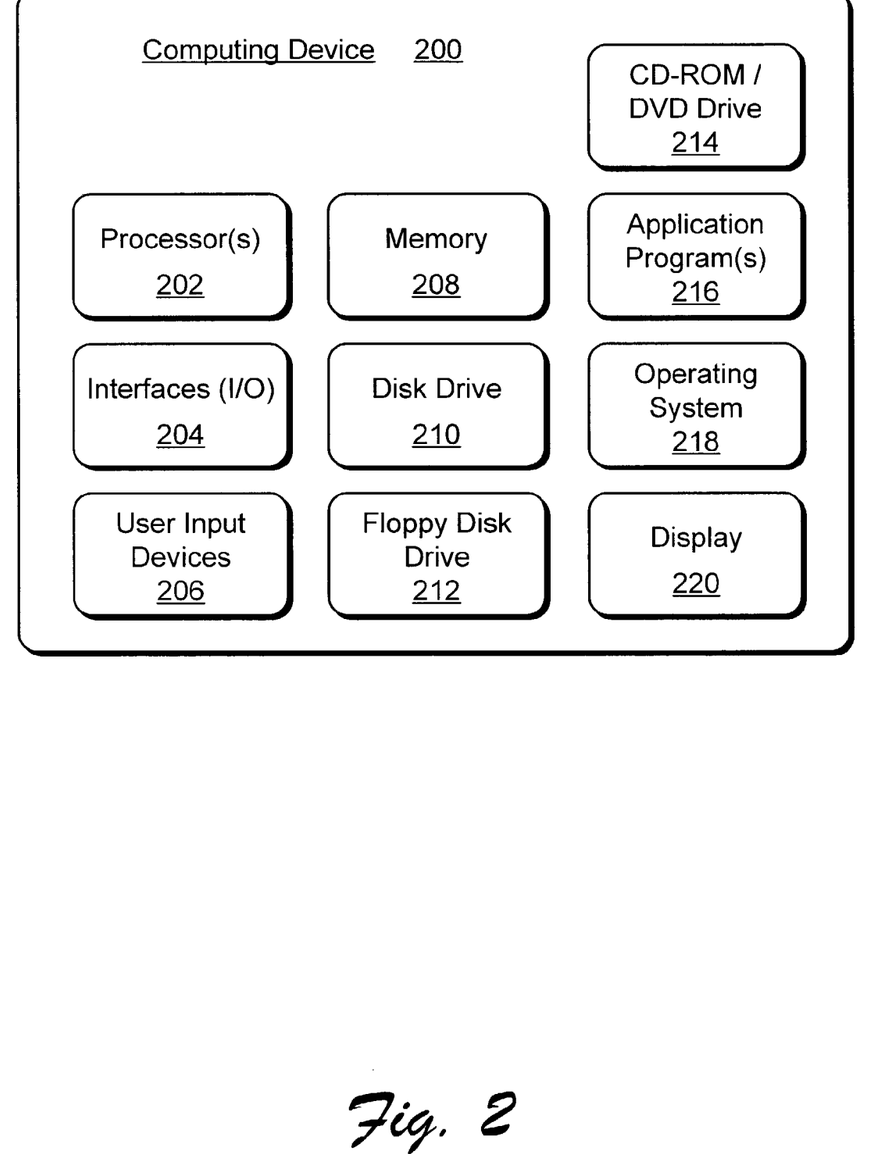
FIG. 2 illustrates various components of an exemplary computing device.

FIG. 2 illustrates various components of an exemplary computing device 200 that can be utilized to implement the inventive techniques described herein. Computing device 200 includes one or more processors 202 (e.g., microprocessors, controllers, etc.), input/output interfaces 204 for the input and/or output of data, and user input devices 206. Processor(s) 202 process various instructions to control the operation of computing device 200, while input/output interfaces 204 provide a mechanism for computing device 200 to communicate with other electronic and computing devices. User input devices 206 can include a keyboard, mouse, pointing device, and/or other mechanisms to interact with, and to input information to computing device 200.

Input/output interfaces 204 can include serial, parallel, and/or network interfaces. A network interface allows devices coupled to a common data communication network to communicate information with computing device 200. Similarly, a communication interface, such as a serial and/or parallel interface, a USB interface, an Ethernet interface, an 802.11 interface, and/or any combination of communication interfaces provides a data communication path directly between computing device 200 and another electronic or computing device.

Computing device 200 also includes a memory 208 (such as ROM and/or RAM), a disk drive 210, a floppy disk drive 212, and a CD-ROM and/or DVD drive 214, all of which provide data storage mechanisms for computing device 200. Any number and combination of memory and storage devices can be connected with, or implemented within, computing device 200. Although not shown, a system bus typically connects the various components within computing device 200.

Computing device 200 also includes one or more application program(s) 216 and an operating system 218 which can be stored in non-volatile memory (e.g., memory 208) and executed on a processor 202 to provide a runtime environment in which the application programs 216 can run or execute. Computing device 200 can also include an integrated display device 220, such as for a personal digital assistant (PDA), a portable computing device, and any other mobile computing device.

Exemplary Image Scanning System in a Computing Environment

Figure 3:
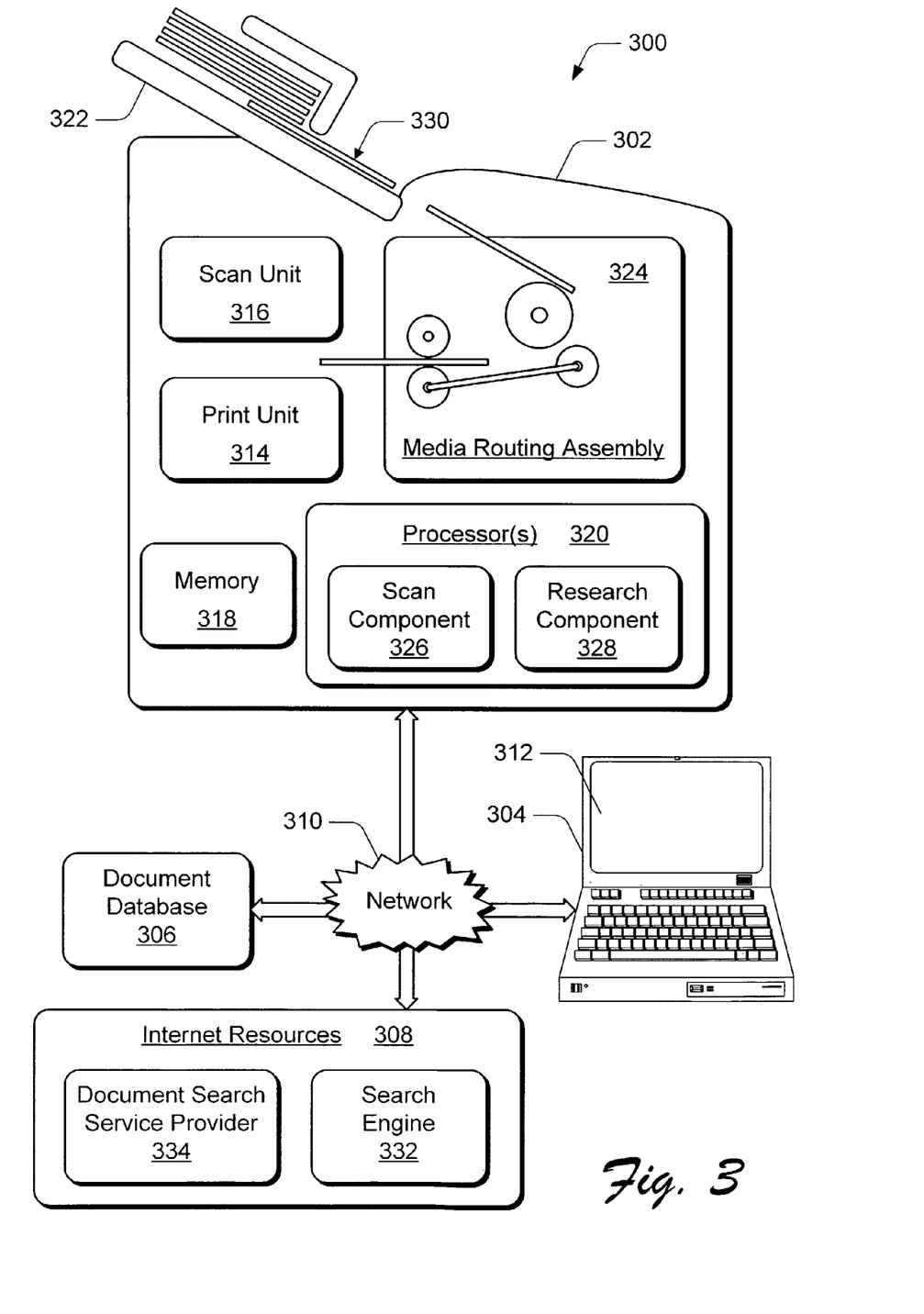
FIG. 3 illustrates components of an image scanning system in an exemplary computing environment.

FIG. 3 illustrates components of an exemplary image scanning system 300 in which a multifunction device 302 has a communication link with a computing device 304, a document database 306, and Internet resources 308 via a data communication network 310. Multifunction device 302 can include one or more of the components of exemplary multifunction device 100 (FIG. 1), and computing device 304 can include one or more of the components of exemplary computing device 200 (FIG. 2), to include a display 312. Although shown as an independent device, document database 306 can be implemented as a component of either multifunction device 302 or computing device 304. Any number and combination of records, fields, and data can be defined, organized, and maintained in document database 306 or similar structure for research reference.

Data communication network 310 can be any type of network, such as a local area network (LAN) or a wide area network (WAN), using any type of network topology and any network communication protocol, to include wireless network communication. Although only the three devices are shown communicatively linked via network 310, a typical network can have any number of devices connected to it, either directly or indirectly via another network system. The Internet is an example of multiple connected network systems each having multiple devices. Multifunction device 302, computing device 304, and document database 306 can also have modems and/or network cards that facilitate network communication and data transfer via data communication network 310.

Multifunction device 302 includes a print unit 314, a scan unit 316, a memory component 318, and one or more processors 320. Each of these components are described above with respect to the exemplary multifunction device 100 (FIG. 1). Multifunction device 302 also includes an automatic document feeder (ADF) 322, a media routing assembly 324, scan component 326, and a research component 328. Automatic document feeder 322 accepts multiple image media 330 and automatically feeds the image media into multifunction device 302 for scanning and/or printing. Image media includes any print media, photographs, graphics, and the like that can be scanned with scan unit 316.

Media routing assembly 324 takes up an image or print media 330 and routes it through multifunction device 302 for scanning and/or printing. When image media 330 is routed within multifunction device 302 by the media routing assembly 324, the image media 330 passes within a proximity of scan unit 316 which scans an image, or regions of an image, from the image media. Scan component 326 can be implemented as optical character recognition software, for example, which executes on processor(s) 318 and receives image data corresponding to a scanned image from scan unit 316. Alternatively, or in addition to scan component 326 receiving image data corresponding to a scanned image, a scan component in computing device 304 (i.e., external to multifunction device 302) receives the image data from scan unit 316 via data communication link 310.

Research component 328 executes on processor(s) 320 and communicates with Internet resources 308 via data communication network 310. Alternatively, a research component can be implemented in computing device 304 as an application program 216 executing on processor(s) 202 (FIG. 2). Although the scan component 326 and the research component 328 are each illustrated and described as a single component configured to perform several functions, the scan component 326 and the research component 328 can each be implemented as several application programs distributed to each perform one or more functions in the multifunction device 302 and/or in an information research system. Additionally, either one or both of the scan component 326 and the research component 328 may reside on a server system or as an Internet resource. Further, the scan component 326 and the research component 328 can each be implemented in any suitable hardware, software, firmware, or combination thereof.

Internet resources 308 include search engine 332 and a document search service provider 334. Although shown as an independent component, search engine 332 can be implemented as a component of the document search service provider 334. Service provider 334 is only one example of a document management system that can receive research information from research component 328, process the information, and search Internet resources 308 for information and documents related to the research information.

Information Research from a Scanned Image Media

Figure 4:
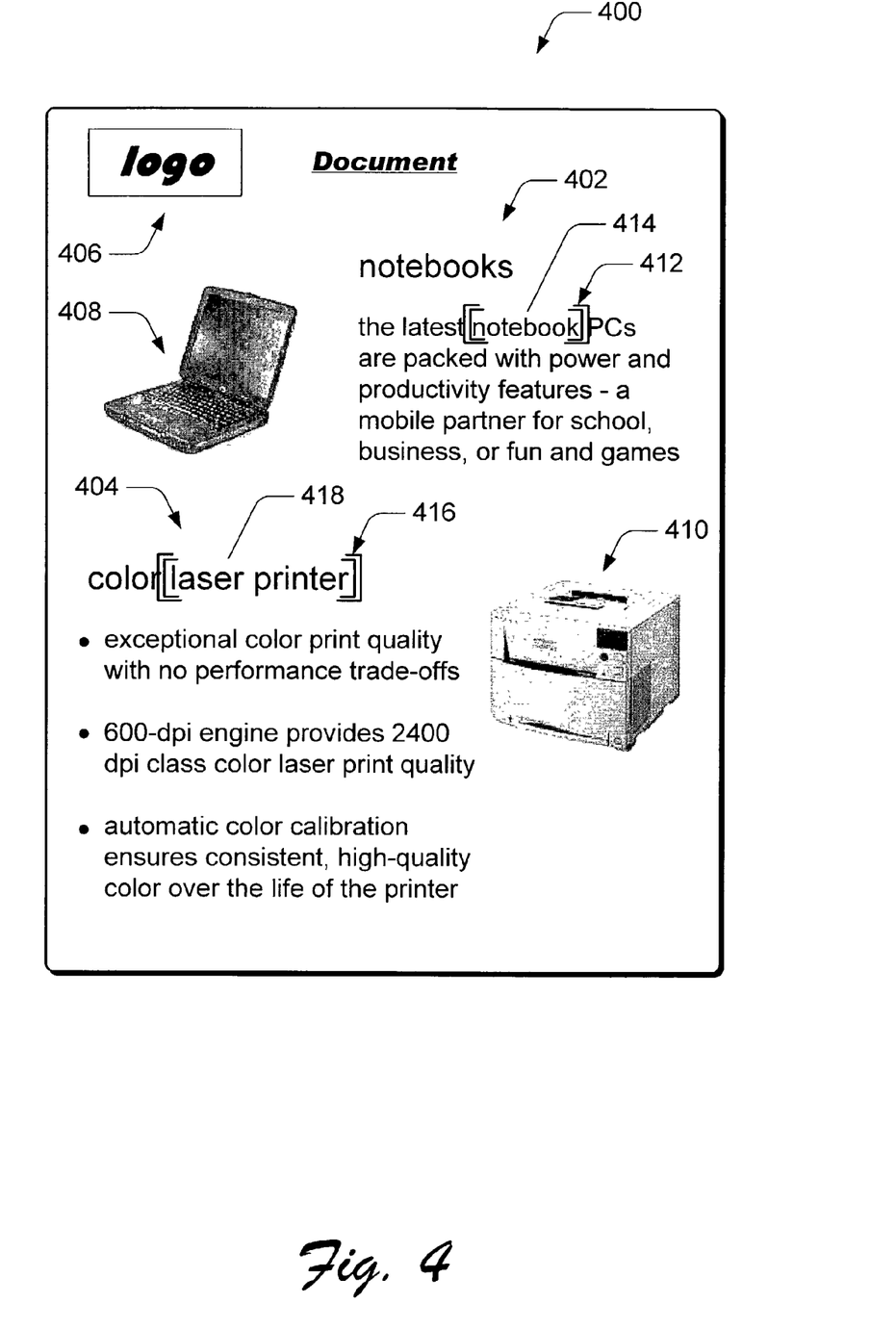
FIG. 4 illustrates an image media document.

FIG. 4 illustrates an exemplary image media 400 that is a document having text regions 402 and 404, and graphics regions 406, 408, and 410. Image media 400 can be a magazine page, for example, having an item of interest that a user wants to find more information about. Image media 400 includes written marks that are a phrase identifier 412 to designate phrase text "notebook" 414 as a selected research term. As used herein, a phrase includes any word or group of words, and may also be characterized as any combination of one or more words separated by a space or punctuation. Image media 400 also includes written marks that are a phrase identifier 416 to designate phrase text "laser printer" 418 as selected research terms. Phrase identifiers 412 and 416 can also be implemented as electronic marks that are symbols or notations added to an electronic scanned image of image media 400.

Figure 5:
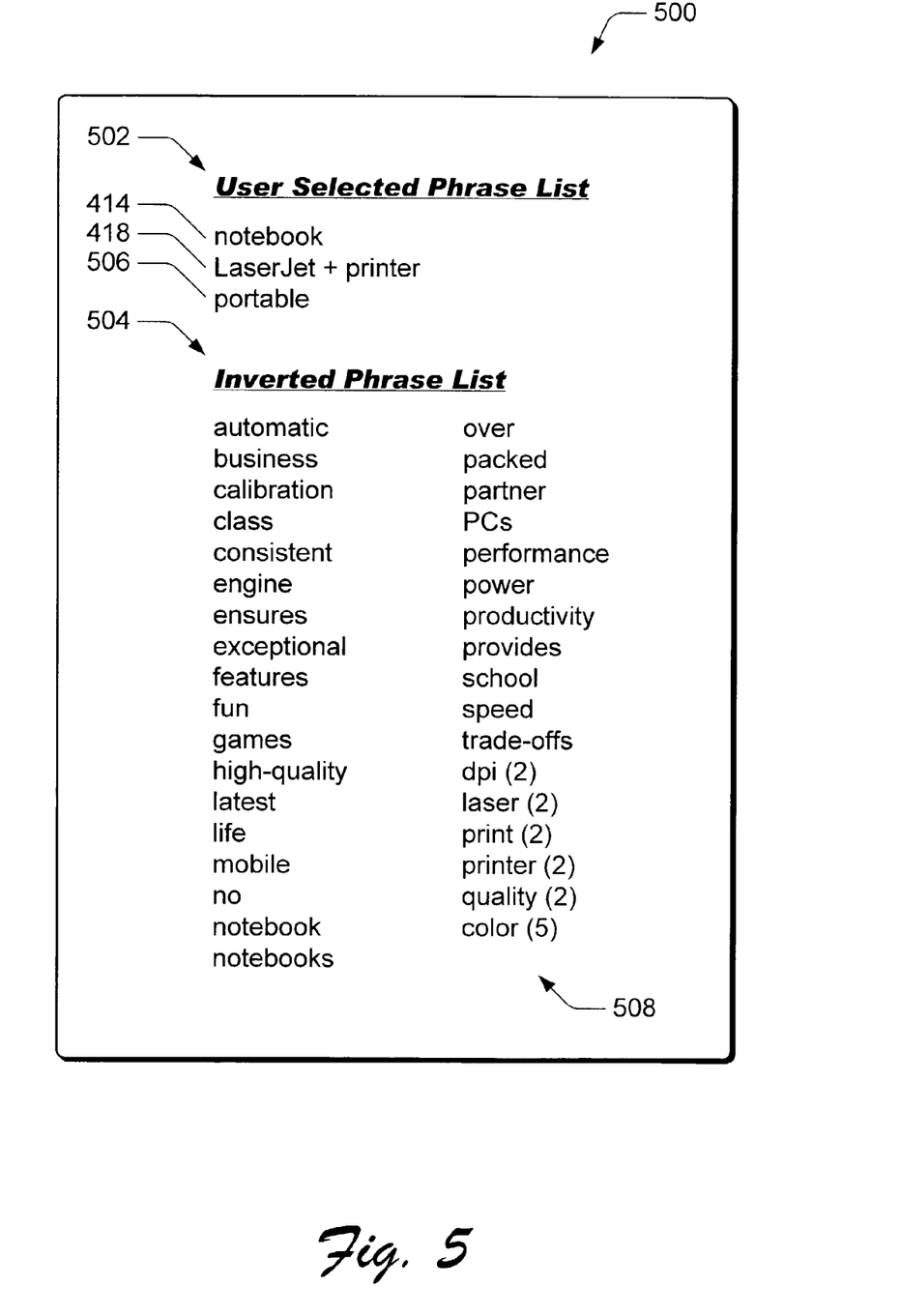
FIG. 5 illustrates an exemplary phrase index document having research terms scanned from the image media document shown in FIG. 4.

FIG. 5 illustrates an exemplary phrase index electronic document 500 that includes a user selected phrase list 502 and an inverted phrase list 504 generated from a scan of the text in image media 400 (FIG. 4). A software application, such as scan component 326 in multifunction device 302 (FIG. 3), or an application program 216 in computing device 200 (FIG. 2), can be implemented to generate the text data with an optical character recognition (OCR) process or similar text recognition process.

The scan component 326 can also be configured to recognize written marks, electronic marks, symbols, and/or notations such as phrase identifiers 412 and 416. The scan component generates selected text data, such as "notebook" 414 designated with phrase identifier 412, and "laser printer" 418 designated with phrase identifier 416. Additionally, the user selected phrase list 502 includes an input phrase, "portable", which is identified as phrase 506. A user can input or specify selected phrases for research with control panel 124 of multifunction device 100, for example.

Inverted phrase list 504 is generated such that the most common terms appear at the end 508 of the inverted phrase list. For example, the term "color" appears in image media 400 five times, and is therefore determined to be a common term that may not generate specific research results. The research terms of phrase lists 502 and 504 are used to initiate research for information related to the text of image media 400 (FIG. 4). Research results from document database 306 and Internet resources 308, for example, can include information and documents such as files, images, objects, programs, and any other electronic forms of data relating to the research terms of phrase lists 502 and 504.

Phrase index electronic document 500 can also be generated from a scan of an electronic document or from an electronic image media received by multifunction device 302. For example, multifunction device 302 can receive an electronic image media in the form of an attachment to an email, or as an electronic facsimile via network 310. Further, multifunction device 302 can receive an electronic image media as a print job from computing device 304, for example.

Methods for Information Research

Methods for information research initiated from a scanned image media may be described in the general context of computer-executable instructions located in computer storage media, including memory storage devices. Generally, computer-executable instructions include routines, programs, objects, components, data structures, and the like that perform particular functions or implement particular abstract data types.

Figure 6:
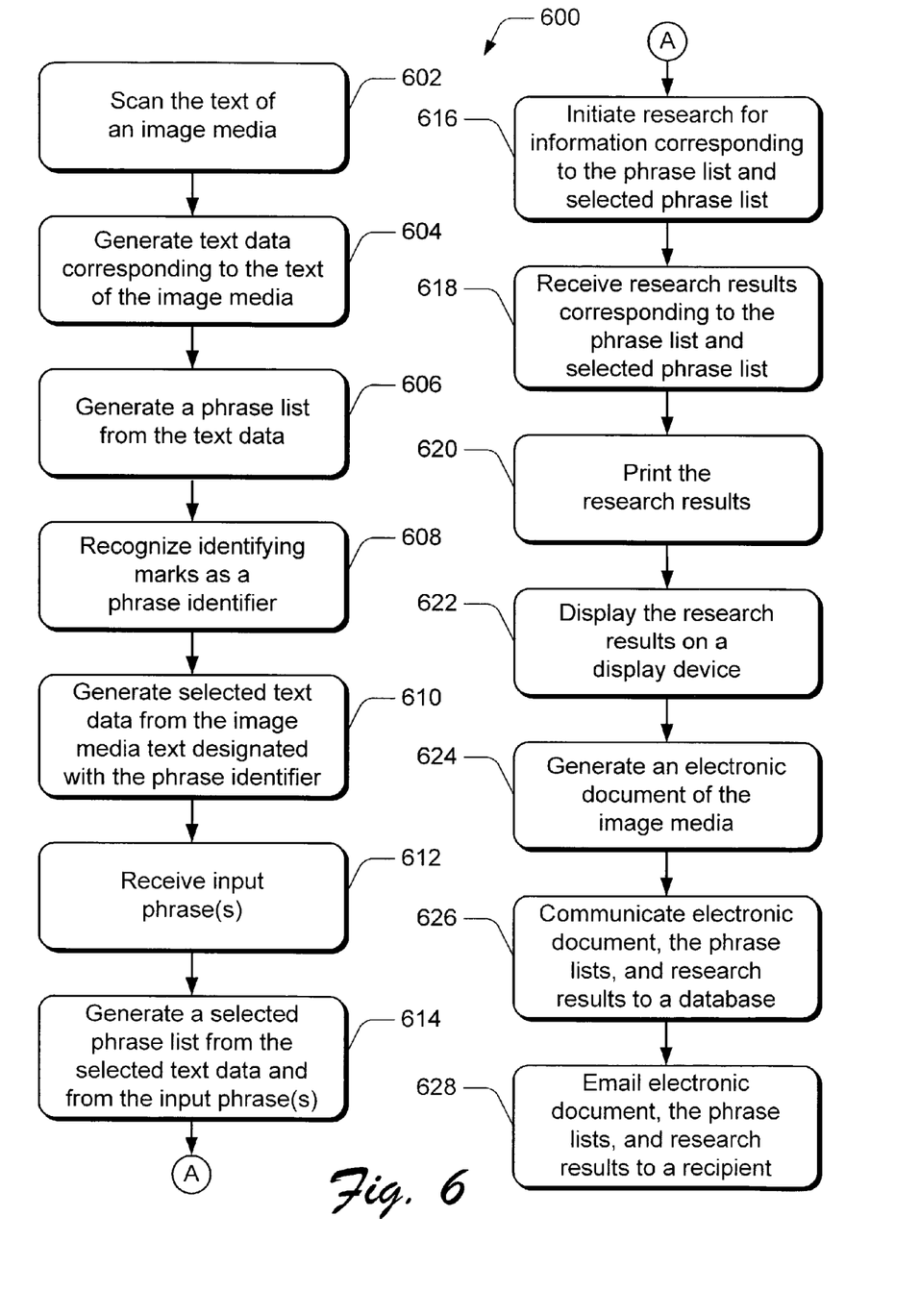
FIG. 6 is a flow diagram that illustrates a method for information research initiated from a scanned image media.

FIG. 6 illustrates a method 600 for information research initiated from a scanned image media. The order in which the method is described is not intended to be construed as a limitation, and any number of the described method blocks can be combined in any order to implement a method for information research. Furthermore, the method can be implemented in any suitable hardware, software, firmware, or combination thereof.

At block 602, text of an image media is scanned with a scanning or multifunction device. For example, text regions 402 and 404 of image media 400 are scanned with scan unit 316 in multifunction device 302 (FIGS. 3–4). At block 604, text data corresponding to the text of the image media is generated. For example, when the printed text images in text regions 402 and 404 of image media 400 are scanned, text data is generated by converting the text images into text characters using optical character recognition or another similar process known to those skilled in the art of scanning technology. Alternatively, text data corresponding to the text of an electronic media image can be generated, such as from a received email, an email attachment, an electronic fax, or from a print job, for example.

At block 606, a phrase list is generated from the text data. For example, the inverted phrase list 504 of electronic document 500 is generated from a scan of the text in image media 400. At block 608, one or more identifying marks are recognized as a phrase identifier. For example, scan component 326 in multifunction device 302 recognizes written marks 412 and 416 on image media 400 as phrase identifiers. Alternatively, the identifying marks are electronic marks that are symbols or notations added to an electronic scanned image of image media 400 with a control panel 124 of multifunction device 302, or with computing device 304 that is communicatively linked to multifunction device 302.

At block 610, selected text data is generated from the image media text designated with the phrase identifier. For example, when the printed text "notebook" 414 and "laser printer" 418 in image media 400 is scanned as selected text designated with phrase identifiers 412 and 416, respectively, selected text data is generated by converting the designated image media text into text characters using optical character recognition or other similar process known to those skilled in the art of scanning technology.

At block 612, one or more input phrases are received. For example, a user can input or specify selected phrases for research with a control panel 124 of multifunction device 302, or input phrases for research with computing device 304 which is communicatively linked to multifunction device 302. Additionally, a user can input word combinations, such as a phrase that is a Boolean expression to form an input research phrase.

At block 614, a selected phrase list is generated from the selected text data and from the one or more input phrases. For example, the user selected phrase list 502 of electronic document 500 is generated from the selected text data of the text "notebook" 414 and "laser printer" 418 in image media 400, and from the user input phrase "portable" 506. Additionally, the selected phrase list can be generated and/or transformed with an administrative component of scan component 326 (FIG. 3), for example. An administrative component can modify, or otherwise transform, the selected phrase list based upon a designated destination of the list, such as for a search agent, and based upon any data or formatting requirements of the selected phrase list destination.

At block 616, research for information corresponding to the phrase list and to the selected phrase list is initiated. Initiating the research can include initiating the research in a document database, such as document database 306, initiating the research for Internet resources 308, communicating the phrase list and the selected phrase list to a search engine 332 that performs the research, and/or communicating the phrase list and the selected phrase list to a document search service provider 334 that performs the research.

At block 618, research results corresponding to the phrase list and to the selected phrase list are received. The research results can include electronic documents, titles of the electronic documents (or other document identifying information), Web pages, a list of Web links, and/or any combination and format of electronic information.

At block 620, the research results are printed and/or at block 622, the research results are displayed on a display device. At block 624, an electronic document of the image media is generated. At block 626, the electronic document, the phrase list and the selected phrase list, and/or the research results are communicated to a document database where the phrase lists are maintained as an index of the scanned document and of the research results. Alternatively, or in addition, the electronic document, the phrase lists, and/or the research results are emailed to a computing device, such as a designated email recipient, at block 628.

CONCLUSION

Information research initiated from a scanned image media provides a research assistant that can locate information and electronic documents related to a document, such as an original scanned or received softcopy of the document. An automated research process can be implemented with a multifunction device and/or with a computing device, or on-line with a document search service provider, with a search engine, or with a document management service.

Although the invention has been described in language specific to structural features and/or methods, it is to be understood that the invention defined in the appended claims is not necessarily limited to the specific features or methods described. Rather, the specific features and methods are disclosed as preferred forms of implementing the claimed invention.

The invention claimed is:

1. A device, comprising:
   a scan unit configured to scan text of an image media;
   a scan component configured to generate text data corresponding to the text; a research component configured to:
   generate one or more phrase lists from the text data; and
   initiate research using Internet resources for information corresponding to the one or more phrase lists.

2. A device as recited in claim 1, wherein the scan component is further configured to recognize a phrase identifier, and generate selected text data corresponding to text designated with the phrase identifier.

3. The device of claim 2, wherein the phrase identifier identifies a selected portion of the text of the image media and wherein other portions of the text are not identified by any phrase identifier.

4. A device as recited in claim 1, wherein:
the scan component is further configured to recognize a phrase identifier, and generate selected text data corresponding to text designated with the phrase identifier; and the research component is further configured to receive one or more input phrases, and generate a selected phrase list from the selected text data and from the one or more input phrases.

5. A device as recited in claim 1, wherein: the scan component is further configured to:
recognize a phrase identifier;
generate selected text data corresponding to text designated with the phrase identifier;
the research component is further configured to:
receive one or more input phrases;
generate a selected phrase list from the selected text data and from the one or more input phrases; and
initiate research for information corresponding to the selected phrase list.

6. A device as recited in claim 1, wherein:
the scan component is further configured to:
recognize a first phrase identifier;
recognize at least a second phrase identifier;
generate selected text data corresponding to text designated with the first phrase identifier and with the second phrase identifier;
the research component is further configured to:
generate a selected phrase list from the selected text data; and
initiate research for information corresponding to the selected phrase list.

7. A device as recited in claim 1, wherein:
the scan component is further configured to:
recognize a first phrase identifier;
recognize at least a second phrase identifier;
generate selected text data corresponding to text designated with the first phrase identifier and with the second phrase identifier;
the research component is further configured to:
receive one or more input phrases; generate a selected phrase list from the selected text data and from the one or more input phrases; and
research for information corresponding to the one or more phrase lists and corresponding to the selected phrase list, wherein the research is directed first to information corresponding to the selected phrase list.

8. A device as recited in claim 1, wherein the scan component is further configured to recognize one or more written marks as a phrase identifier.

9. The device of claim 8, wherein the scan component is configured to recognize one or more marks that have been written upon the image media prior to scanning by the scan unit as the phrase identifier.

10. A device as recited in claim 1, wherein the scan component is further configured to recognize one or more electronic marks as a phrase identifier.

11. A device as recited in claim 1, wherein: the scan component is further configured to:
recognize one or more written marks as a phrase identifier;
generate selected text data corresponding to text designated with the one or more written marks;
the research component is further configured to:
generate a selected phrase list from the selected text data; and research for information corresponding to the one or more phrase lists and corresponding to the selected phrase list, wherein the research is directed first to information corresponding to the selected phrase list.

12. A device as recited in claim 1, wherein the research component is further configured to initiate the research in a document database.

13. A device as recited in claim 1, wherein the research component is further configured to initiate the research with a document management system.

14. A device as recited in claim 1, wherein the research component is further configured to communicate the one or more phrase lists to a search engine that performs the research.

15. A device as recited in claim 1. wherein the research component is further configured to communicate the one or more phrase lists to a document search service provider that performs the research.

16. A device as recited in claim 1, wherein the research component is further configured to receive research results corresponding to the one or more phrase lists.

17. A device as recited in claim 1, further comprising a print unit. wherein the research component is further configured to receive research results corresponding to the one or more phrase lists, and wherein the print unit is configured to print the research results.

18. A device as recited in claim 1, wherein:
the scan component is further configured to generate an electronic document of the image media; and
the research component is further configured to communicate the electronic document and the one or more phrase lists to a document database where the one or more phrase lists are maintained as an index of the electronic document.

19. A device as recited in claim 1, wherein:
the scan component is further configured to generate an electronic document of the image media;
the research component is further configured to:
receive research results corresponding to the one or more phrase lists; and
communicate the electronic document, the one or more phrase lists, and the research results to a document database where the one or more phrase lists are maintained as an index of the electronic document and of the research results.

20. A device as recited in claim 1, wherein:
the scan component is further configured to generate an electronic document of the image media; the research component is further configured to:
receive research results corresponding to the one or more phrase lists; and email the electronic document, the one or more phrase lists, and the research results to a computing device.

21. A system, comprising:
a scan unit configured to scan text of an image media;
a scan component configured to:
recognize a phrase identifier; generate text data corresponding to the text;
generate selected text data corresponding to text designated with the phrase identifier;
a research component configured to:
generate a phrase list from the text data and from the selected text data; and initiate research of Internet resources for information corresponding to the phrase list.

22. A system as recited in claim 21, wherein the research component is further configured to:

receive one or more input phrases; and
generate the phrase list from the text data, the selected text data, and from the one or more input phrases.

23. A system as recited in claim 21, wherein the scan component is further configured to:
recognize at least one other phrase identifier; and generate the selected text data corresponding to text designated with the phrase identifier and with the at least one other phrase identifier.

24. A system as recited in claim 21, wherein the scan component is further configured to recognize one or more written marks as the phrase identifier.

25. A system as recited in claim 21, wherein the scan component is further configured to recognize one or more electronic marks as the phrase identifier.

26. A system as recited in claim 21, wherein the research component is further configured to initiate the research in a document database.

27. A system as recited in claim 21, wherein the research component is further configured to initiate the research with a document management system.

28. A system as recited in claim 21, wherein the research component is further configured to communicate the phrase list to a search engine that performs the research.

29. A system as recited in claim 21, wherein the research component is further configured to communicate the phrase list to a document search service provider that performs the research.

30. A system as recited in claim 21, wherein the research component is further configured to receive research results corresponding to the phrase list, the research results including electronic documents.

31. A system as recited in claim 21, wherein the research component is further configured to receive research results corresponding to the phrase list, the research results including World Wide Web pages.

32. A system as recited in claim 21, wherein the research component is further configured to receive research results corresponding to the phrase list, the research results including a list of World Wide Web links.

33. A system as recited in claim 21, further comprising a print unit, wherein the research component is further configured to receive research results corresponding to the phrase list, and wherein the print unit is configured to print at least a portion of the research results.

34. A system as recited in claim 21, further comprising a display device, wherein the research component is further configured to receive research results corresponding to the phrase list, and wherein the display device is configured to display at least a portion of the research results.

35. A system as recited in claim 21, further comprising a multifunction device comprising the scan unit, the scan component, and the research component.

36. A system as recited in claim 21, further comprising:
a computing device comprising the scan component and the research component; and
a multifunction device comprising the scan unit, the multifunction device configured to communicate the scanned text of the image media to the computing device.

37. A method, comprising:
generating text data corresponding to text of an image media;
generating at least one phrase list from the text data; and
initiating research using Internet resources for information corresponding to the at least one phrase list.

38. A method as recited in claim 37, further comprising scanning the text of the image media.

39. A method as recited in claim 37, further comprising receiving the text of the image media from a computing device via a communication link.

40. A method as recited in claim 37, further comprising:
recognizing a phrase identifier; and
generating selected text data corresponding to text designated with the phrase identifier.

41. A method as recited in claim 37, further comprising:
recognizing a phrase identifier;
generating selected text data corresponding to text designated with the phrase identifier; and
wherein generating the at least one phrase list includes generating a selected phrase list from the selected text data.

42. A method as recited in claim 37, further comprising:
recognizing a phrase identifier;
generating selected text data corresponding to text designated with the phrase identifier;
receiving one or more input phrases; and generating a selected phrase list from the selected text data and from the one or more input phrases.

43. A method as recited in claim 37, further comprising:
recognizing a phrase identifier;
generating selected text data corresponding to text designated with the phrase identifier;
receiving one or more input phrases;
generating a selected phrase list from the selected text data and from the one or more input phrases; and
initiating research for information corresponding to the selected phrase list.

44. A method as recited in claim 37, further comprising recognizing one or more written marks as a phrase identifier.

45. A method as recited in claim 37, further comprising recognizing one or more electronic marks as a phrase identifier.

46. A method as recited in claim 37, further comprising:
recognizing one or more written marks as a phrase identifier;
generating selected text data corresponding to text designated with the one or more written marks;
generating a selected phrase list from the selected text data; and
researching for information corresponding to the at least one phrase list and corresponding to the selected phrase list, the researching being directed first to information corresponding to the selected phrase list.

47. A method as recited in claim 37, wherein initiating the research includes initiating the research in a document database.

48. A method as recited in claim 37, wherein initiating the research includes initiating the research with a document management system.

49. A method as recited in claim 37, wherein initiating the research includes communicating the at least one phrase list to a search engine that performs the research.

50. A method as recited in claim 37, wherein initiating the research includes communicating the at least one phrase list to a document search service provider that performs the research.

51. A method as recited in claim 37, further comprising: receiving research results corresponding to the at least one phrase list.

52. A method as recited in claim 37, further comprising receiving research results corresponding to the at least one phrase list, the research results including electronic documents.

53. A method as recited in claim 37, further comprising:
receiving research results corresponding to the at least one phrase list, the research results including World Wide Web pages.

54. A method as recited in claim 37, further comprising:
receiving research results corresponding to the at least one phrase list, the research results including a list of World Wide Web links.

55. A method as recited in claim 37, further comprising:
receiving research results corresponding to the at least one phrase list; and
printing at least a portion of the research results.

56. A method as recited in claim 37, further comprising:
receiving research results corresponding to the at least one phrase list; and
displaying at least a portion of the research results.

57. A method as recited in claim 37, further comprising:
generating an electronic document of the image media; and
communicating the electronic document and the at least one phrase list to a document database where the at least one phrase list is maintained as an index of the electronic document.

58. A method as recited in claim 37, further comprising:
generating an electronic document of the image media;
receiving research results corresponding to the at least one phrase list; and
communicating the electronic document, the at least one phrase list, and the research results to a document database where the at least one phrase list is maintained as an index of the electronic document and of the research results.

59. A method as recited in claim 37, further comprising:
generating an electronic document of the image media;
receiving research results corresponding to the at least one phrase list; and
emailing the electronic document, the at least one phrase list, and the research results to a computing device.

60. One or more computer-readable media comprising computer executable instructions that, when executed, direct a device to:

generate text data corresponding to text of an image media;

recognize a phrase identifier;

generate selected text data corresponding to text of the image media designated with the phrase identifier;

generate a phrase list from the text data and from the selected text data; and initiate research using Internet resources for information corresponding to the phrase list.

61. One or more computer-readable media as recited in claim 60, further comprising computer executable instructions that, when executed, direct the device to scan the text of the image media.

62. One or more computer-readable media as recited in claim 60, further comprising computer executable instructions that, when executed, direct the device to receive the text of the image media from a computing device via a communication link.

63. One or more computer-readable media as recited in claim 60, wherein the computer executable instructions further direct the device to recognize one or more written marks as the phrase identifier.

64. One or more computer-readable media as recited in claim 60, wherein the computer executable instructions further direct the device to recognize one or more electronic marks as the phrase identifier.

65. One or more computer-readable media as recited in claim 60, wherein the computer executable instructions further direct the device to communicate the phrase list to a document search service provider that performs the research when the device initiates research for the information.

66. One or more computer-readable media as recited in claim 60, further comprising computer executable instructions that, when executed, direct the device to research for information corresponding to the phrase list.

67. One or more computer-readable media as recited in claim 60, further comprising computer executable instructions that, when executed, direct the device to receive research results corresponding to the phrase list.

* * * * *

UNITED STATES PATENT AND TRADEMARK OFFICE
CERTIFICATE OF CORRECTION

PATENT NO. : 7,151,864 B2  
APPLICATION NO. : 10/247113  
DATED : December 19, 2006  
INVENTOR(S) : Steven G. Henry et al.

It is certified that error appears in the above-identified patent and that said Letters Patent is hereby corrected as shown below:

In column 10, line 15, in Claim 15, delete "claim 1." and insert -- claim 1, --, therefor.

In column 10, line 23, in Claim 17, delete "unit." and insert -- unit, --, therefor.

Signed and Sealed this

Fifth Day of May, 2009

JOHN DOLL  
*Acting Director of the United States Patent and Trademark Office*